(12) United States Patent
Watanuki et al.

(10) Patent No.: US 6,442,985 B1
(45) Date of Patent: Sep. 3, 2002

(54) LOCK APPARATUS AND LOCK SYSTEM (75) Inventors: Yoshio Watanuki; Masaki Tamura; Tetsuyuki Tsukano, all of Kanagawa-ken; Shigeo Chiba, Tokyo, all of (JP)

(73) Assignees: Nissan Motor Co., Ltd., Kanagawa-ken (JP); Alpha Corporation, Kanagawa-ken (JP)

( * ) Notice: Subject to any disclaimer, the term of this patent is extended or adjusted under 35 U.S.C. 154(b) by 16 days.

(21) Appl. No.: 09/588,502

(22) Filed: Jun. 7, 2000

(30) Foreign Application Priority Data

Jun. 11, 1999 (JP) .......................... 11-165653
Jun. 11, 1999 (JP) .......................... 11-165699

(51) Int. Cl.$^7$ .............................. B60R 25/02
(52) U.S. Cl. ................. 70/186; 70/278.2; 70/278.3
(58) Field of Search ................ 70/278.2, 278.3, 70/252, 186, 278.7, 279.1

(56) References Cited

U.S. PATENT DOCUMENTS 4,716,748 A * 1/1988 Watanuki et al. ............ 70/252
5,092,147 A * 3/1992 Mochida et al. ............. 70/252
6,125,671 A * 10/2000 Suzuki ........................ 70/186

* cited by examiner

Primary Examiner—William A. Cuchlinski, Jr.
Assistant Examiner—Marthe Y. Marc-Coleman
(74) Attorney, Agent, or Firm—McDermott, Will & Emery (57) ABSTRACT A lock apparatus which can be locked or unlocked by an electronic key or mechanical key, includes a cylinder casing, a sleeve disposed rotatably inside the cylinder casing, a key cylinder disposed rotatably inside the sleeve and in which a mechanical key can be inserted, a tumbler disposed on the key cylinder and which the mechanical key can engage, a key cylinder lock actuator for locking or unlocking a rotation of the sleeve with respect to the cylinder casing and a control unit disposed on the key cylinder side for carrying out transmission and reception of electronic signal for verifying IDs. When, as a result of the ID verification, the ID of the control unit and the ID of the electronic key coincide with each other, the rotation of the sleeve with respects to the cylinder casing is released. Also, when the tumbler engages the sleeve, the key cylinder is rotatable with the sleeve by operating a key cylinder operating portion.

20 Claims, 9 Drawing Sheets

(PRIOR ART)

LOCK APPARATUS AND LOCK SYSTEM

CROSS REFERENCES TO RELATED APPLICATIONS

The entire contents of a Patent Application No. TOKUGANHEI 11-165699 with a filing date of Jun. 11, 1999 in Japan, and those of a Patent Application No. TOKUGANHEI 11-165653 with a filing date of Jun. 11, 1999 in Japan are hereby incorporated by reference.

BACKGROUND OF THE INVENTION

The present invention relates to a lock apparatus and lock system, and more particularly to a lock apparatus and a lock system capable of preferably using both an electronic key and a mechanical key.

Figure 9:
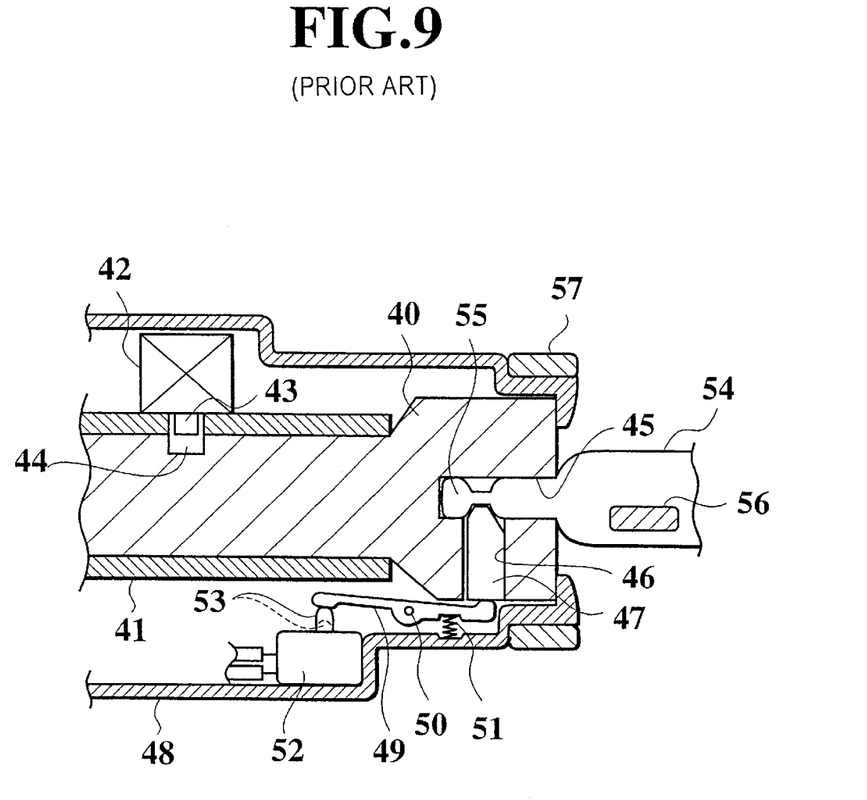
FIG. 9 is a sectional view of a lock apparatus taken for consideration of the inventors of the present invention.
Figure 10:
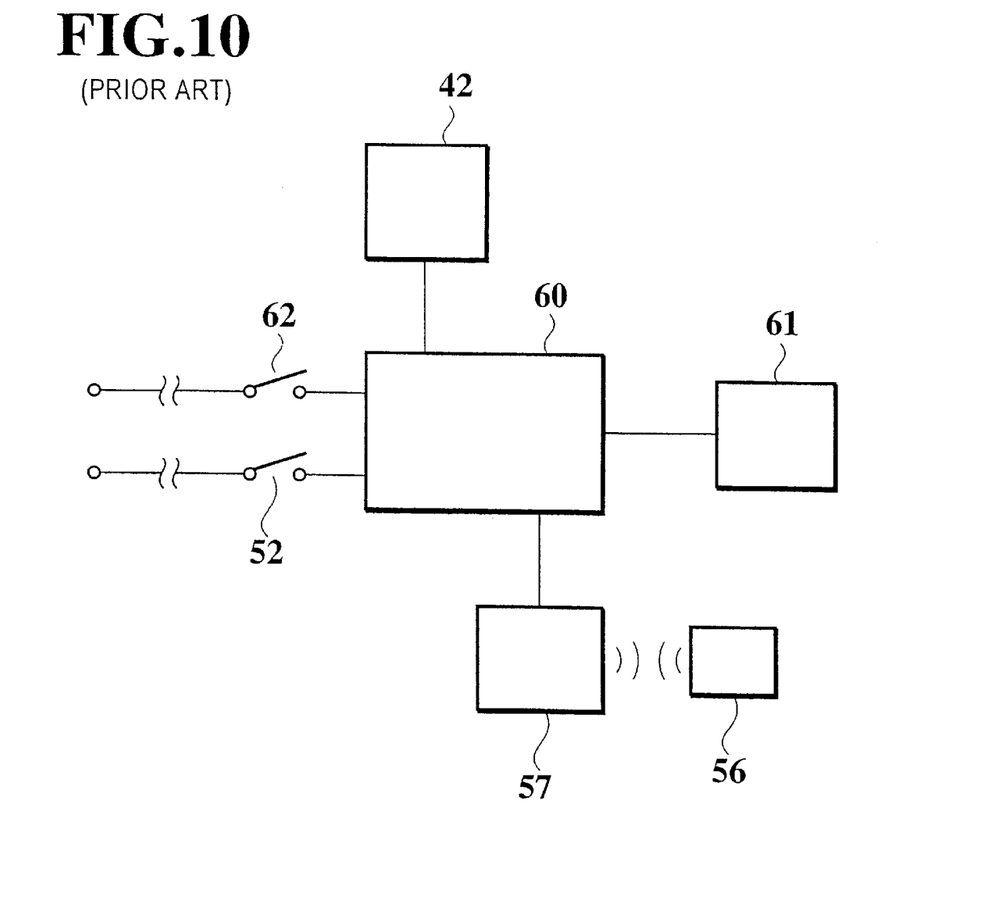
FIG. 10 is a block diagram of an electric circuit used in the above lock apparatus.

According to consideration of the inventors of the present invention, there is a steering lock apparatus as shown in FIGS. 9, 10.

In FIG. 9, reference numeral 40 denotes a key cylinder and reference numeral 41 denotes a cylinder casing.

Reference numeral 42 denotes a key cylinder lock solenoid which engages or disengages a stopper 43 with/from an engaging groove 44 in the key cylinder 40 to lock and unlock a rotation of the key cylinder 40.

A slider hole 46 is provided in a lower portion of the key cylinder 40 such that it goes through a key insertion hole 45. A slider 47 is disposed in the slider hole 46 freely slidably in a direction perpendicular to the key insertion hole 45.

A switch lever 49 is swingably supported by a pin 50 on a bottom portion of a housing 48 and an end of the switch lever 49 is urged upward by a spring 51. As a result, the slider 47 is pushed up by the end so that a top end of the slider 47 is protruded into the key insertion hole 45.

Further, a key presence/absence detecting switch 52 is disposed on the bottom portion of the housing 48 so that an actuating element 53 opposes the other end of the switch lever 49.

If an insertion portion 55 of the electronic key 54 is inserted into the key insertion hole 45, the slider is moved downward. Consequently, pressing of the switch lever 49 by the other end of the actuating element 53 is released, so that the, key presence/absence detecting switch 52 is turned ON.

The electronic key 54 incorporates a circuit chip 56 which memorizes a predetermined identity code (ID).

An annular antenna coil 57 is fit around an end portion of the housing 48.

With the above described structure, when the insertion portion 55 of the electronic key 54 is inserted into the key insertion hole 45 so that the key presence/absence detecting switch 52 is turned ON, the control unit shown in FIG. 10 carries out transmission and reception of electronic signal between the antenna coil 57 and circuit chip 56 through electric wave so as to verify ID of the electronic key 54 with that memorized in the control unit 60. Then, only when the IDs coincide with each other, a lock release signal is dispatched from the control unit 60 to the key cylinder lock solenoid 42 so as to release the lock on the key cylinder 40. At the same time, a driving permission signal is sent to a driving control unit 61 of an engine so as to enable startup of the engine.

That is, the steering lock apparatus enables a rotation of the key cylinder 40 only when the IDs coincide, so as to turn ON the ignition switch 62 (starter switch is actuated). Consequently, the driving permission signal is sent to the driving control unit 61 so as to enable startup of the engine. Thus, even when other key than the electronic key 54 is used, not only a rotation of the key cylinder but also startup of the engine is prevented thereby contributing to preventing a car from being stolen.

SUMMARY OF THE INVENTION

However, according to the above consideration, because the key cylinder 40 cannot be rotated by a key other than the specific electronic key 54, when a supply of power to an electronic circuit is disabled when the battery goes dead for example, the steering lock cannot be released. In such a case, it is very inconvenient to secure the steering operation and move a car to a desired place.

Accordingly, the present invention intends to provide a lock apparatus and lock system which enable the key cylinder to be rotated using the mechanical key when a supply of electric power to the electronic circuit is disabled, for example when the battery goes dead, and namely, which enables to release a lock thereon so that it is capable of releasing the lock quickly and securely when the release of the lock is required at an emergency or the like.

To achieve the above object, according to an aspect of the present invention, there is provided a lock apparatus capable of being locked and unlocked by an electronic key and a mechanical key, comprising: a cylinder casing; a sleeve disposed rotatably inside the cylinder casing; a key cylinder disposed rotatably inside the sleeve and having a mechanical key insertion hole in which the mechanical key can be inserted; a tumbler disposed in the key cylinder; a key cylinder lock actuator locking and unlocking a rotation of the sleeve with respect to the cylinder casing; a control unit disposed on the side of the key cylinder and carrying out transmission and reception of an electronic signal so as to perform ID verification between the control unit and a circuit chip disposed on the side of the electronic key and generating an electronic signal; and a key cylinder operating portion capable of rotating the key cylinder when the ID of the control unit and the ID of the electronic key coincide with each other as a result of the ID verification. Usually, the tumbler is connected to the sleeve so as to lock a rotation of the key cylinder with respect to the sleeve, and when the mechanical key is inserted into the mechanical key insertion hole of the key cylinder so that the mechanical key engages the tumbler, the connection thereof with the sleeve is released so as to enable the rotation of the key cylinder with respect to the sleeve. The control unit, when the ID of the control unit and the ID of the electronic key coincide with each other as a result of the ID verification, sends a lock release signal to the key cylinder lock actuator so as to release the lock on the rotation of the sleeve with respect to the cylinder casing. When, as a result of the ID verification, the ID of the control unit and the ID of the electronic key coincide with each other and the rotation of the sleeve with respect to the cylinder casing is released and also when the tumbler engages the sleeve, the key cylinder is rotable with the sleeve by operating the key cylinder operating portion.

According to another aspect of the present invention, there is provided a lock system capable of being locked and unlocked by an electronic key and a mechanical key, comprising: an electronic key having a circuit chip generating an electronic signal relating to the ID of a key; a mechanical key having a key plate portion in which a key groove is formed; a cylinder casing, a sleeve disposed rotatably inside the cylinder casing; a key cylinder disposed rotatably inside the sleeve and having a mechanical key insertion hole in which the mechanical key can be inserted; a tumbler disposed in the key cylinder; a key cylinder lock actuator locking and unlocking a rotation of the sleeve with respect to the cylinder casing; a control unit disposed on the side of the key cylinder and carrying out transmission and reception of an electronic signal so as to perform ID verification between the control unit and a circuit chip generating an electronic signal and disposed on the side of the electronic key; and a key cylinder operating portion capable of rotating the key cylinder when the ID of the control unit and the ID of the electronic key coincide with each other as a result of the ID verification. Usually, the tumbler is connected to the sleeve so as to lock a rotation of the key cylinder with respect to the sleeve and when the mechanical key is inserted into the mechanical key insertion hole of the key cylinder so that the mechanical key engages the tumbler, the connection thereof with the sleeve is released so as to enable the rotation of the key cylinder with respect to the sleeve. The control unit, when the ID of the control unit and the ID of the electronic key coincide with each other as a result of the ID verification, sends a lock release signal to the key cylinder lock actuator so as to release the lock on a rotation of the sleeve with respect to the cylinder casing. When, as a result of the ID verification, the ID of the control unit and the ID of the electronic key coincide with each other and the rotation of the sleeve with respect to the cylinder casing is released and also when the tumbler engages the sleeve, the key cylinder is rotable with the sleeve by operating the key cylinder operating portion.

DETAILED DESCRIPTION OF THE PREFERRED EMBODIMENTS

Hereinafter, the respective embodiments of the lock apparatus and lock system of the present invention will be described in detail with reference to the accompanying drawings.

First, a lock apparatus, and also lock system using such a lock apparatus, electronic key and mechanical key of the first embodiment will be described with reference to FIGS. 1 to 4.

Figure 1:
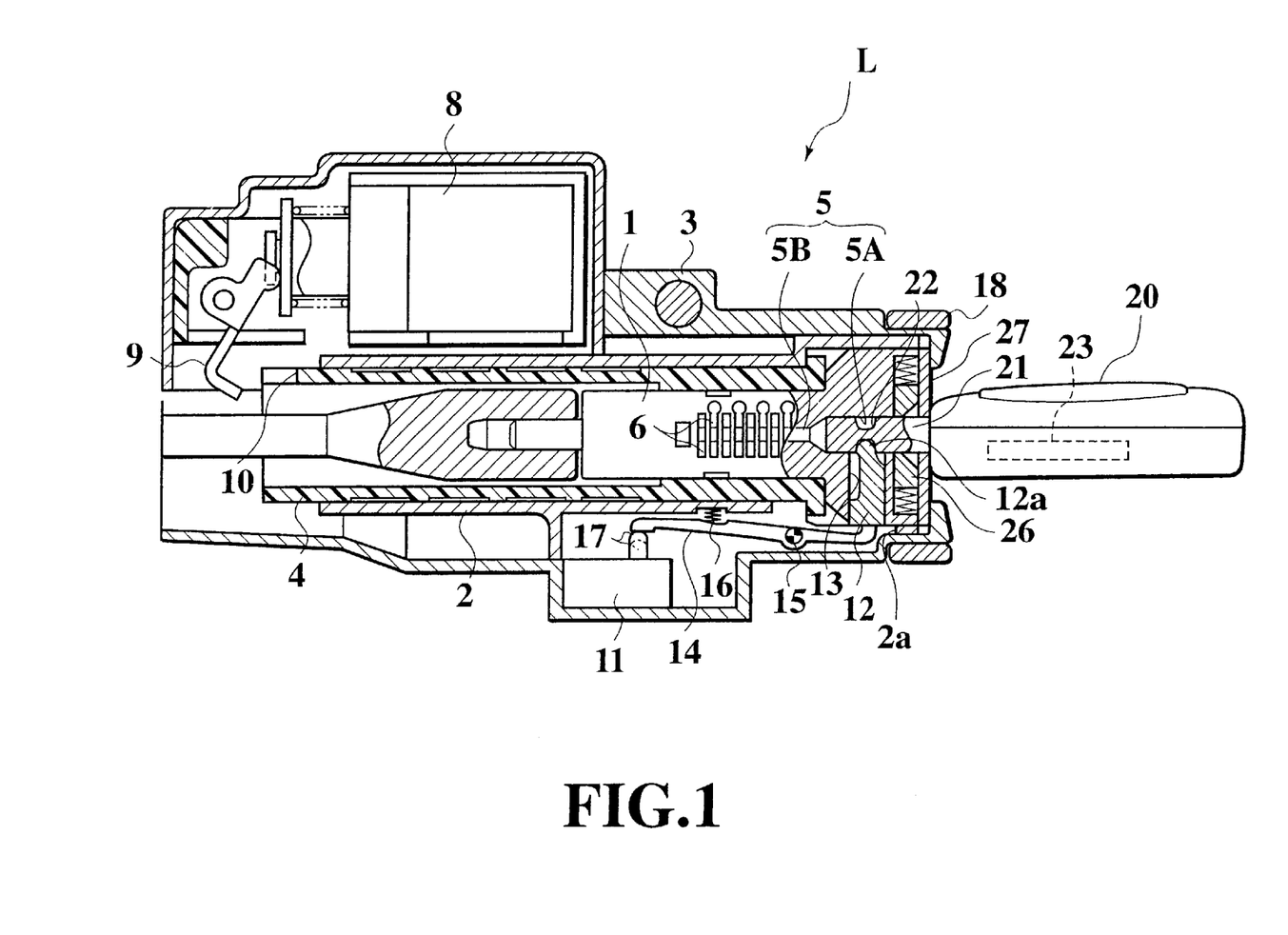
FIG. 1 is a sectional view of a lock apparatus and lock system according to a first embodiment of the present invention.

As shown in FIG. 1, in the lock apparatus L, reference numeral 1 denotes a key cylinder, reference numeral 2 denotes a cylinder casing, and reference numeral 3 denotes a housing in which the cylinder casing 2 is fixed.

The key cylinder 1 is inserted freely rotatably into a sleeve 4 whose small diameter portion is disposed in the cylinder casing freely rotatably.

A key insertion hole 5 of the key cylinder 1 is comprised of an electronic key insertion hole 5A in which an insertion portion 21 of the electronic key 20 (see FIG. 3A) is to be inserted and a mechanical key insertion hole 5B formed in a deeper portion relative to the electronic key insertion hole 5A. The electronic key insertion hole 5A acts as an engaging portion as well as an insertion portion.

The key cylinder 1 includes a plurality of tumblers 6 which advance and retreats from/to a peripheral face of the mechanical insertion hole 5B corresponding to an insertion or removal of the mechanical key 25 (see FIG. 3B) into/from the mechanical insertion hole 5B, the tumblers being incorporated in the mechanical key insertion portion 5B. A relation between the mechanical key 25 and tumblers 6 is the same as that of ordinary key cylinder mechanism.

Figure 2A:
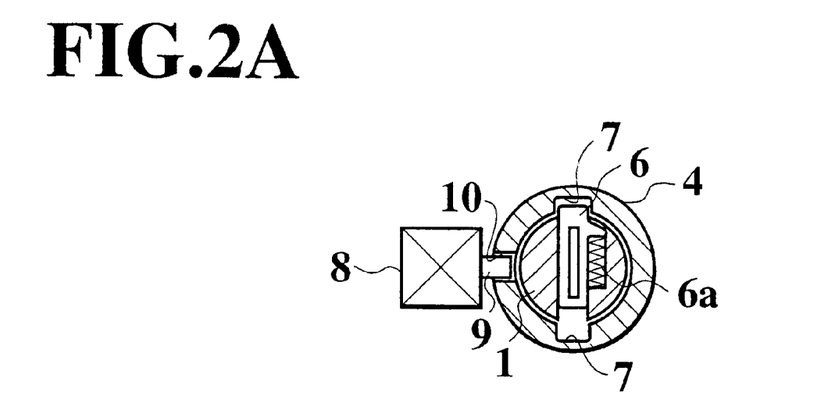
FIGS. 2A to 2C are explanatory diagrams showing schematically a relation between the key cylinder and sleeve according to the embodiment.
Figure 2B:
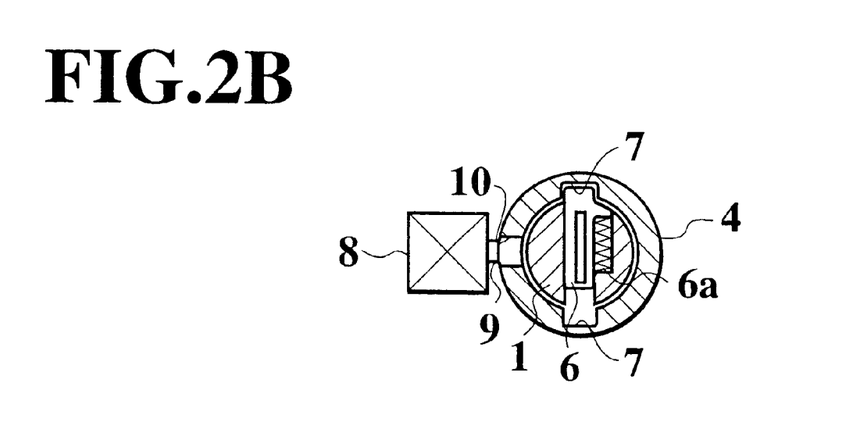
Figure 2C:
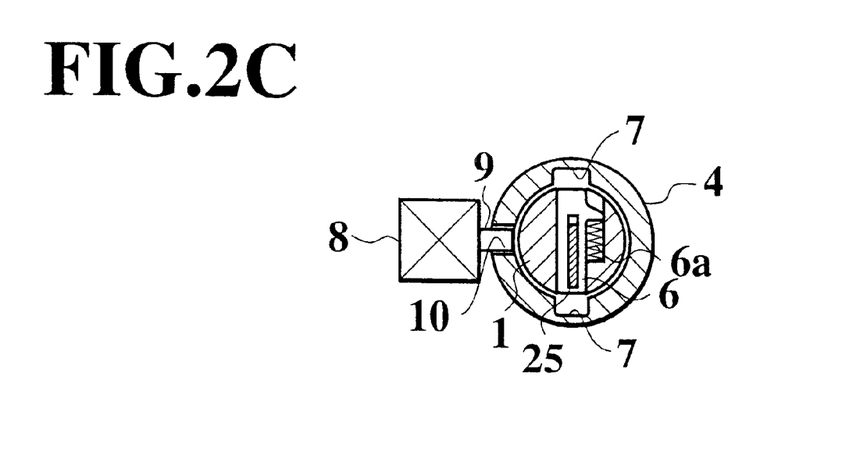

Tumbler engaging grooves 7 are formed in an inner peripheral face of the sleeve 4 as shown in FIGS. 2A to 2C so that the tumblers 6 engage and disengage from the tumbler engaging grooves 7. Corresponding to engagement and disengagement between the tumbler 6 and tumbler engaging groove 7, connection and disconnection of the sleeve 4 and key cylinder 1 are carried out.

Reference numeral 8 denotes a solenoid as a key cylinder lock actuator disposed in an upper portion of the housing 3. The key cylinder lock solenoid 8 engages or disengages the stopper 9 with/from the lock groove 10 provided in the sleeve 4 so as to lock and unlock a rotation of the sleeve 4 correspondingly.

Reference numeral 11 denotes a key presence/absence detecting switch as a sensor for detecting a presence/absence of the key, disposed in a lower portion of the housing 3, the key presence/absence detecting switch having a slider 12 as a key detecting member.

An end portion of the cylinder casing 2 is disposed so as to oppose an outer peripheral face of a large diameter portion of the key cylinder 1 with a minute clearance with respect thereto.

A slider hole 13 is provided in the lower portion of the large diameter portion of the key cylinder 1 such that it goes through a center position in an axial direction of the electronic key insertion hole 5A. The slider 12 is disposed in the slider hole 13 freely slidable in a direction perpendicular to the electronic key insertion hole 5A such that a contact portion 12a which is an end of the slider 12 is protruded into the electronic key insertion hole 5A.

A window portion 2a is formed at a portion corresponding to the slider hole 13 formed in the cylinder casing 2. An end of a switch lever 14 as a detecting portion of the key presence/absence detecting switch 11 is capable of making contact with a bottom end of the slider 12 through the window portion 2a.

The switch lever 14 is swingably supported by a pin 15 in the lower portion of the housing 3 and an end of the switch lever 14 is urged upward by a spring 16, so that the slider 12 is pushed upward by the end and then, the contact portion 12a which is that end is protruded into the electronic key insertion hole 5A. If the insertion portion 21 of the electronic key 20 is inserted into the electronic key insertion hole 5A or the mechanical key 25 is inserted into the mechanical key insertion hole 5B, the slider 12 is moved downward. Then, pressing of an actuating element 17 is released by the other end of the switch lever 14 so that the key presence/absence detecting switch 11 is turned on.

Figure 3A:
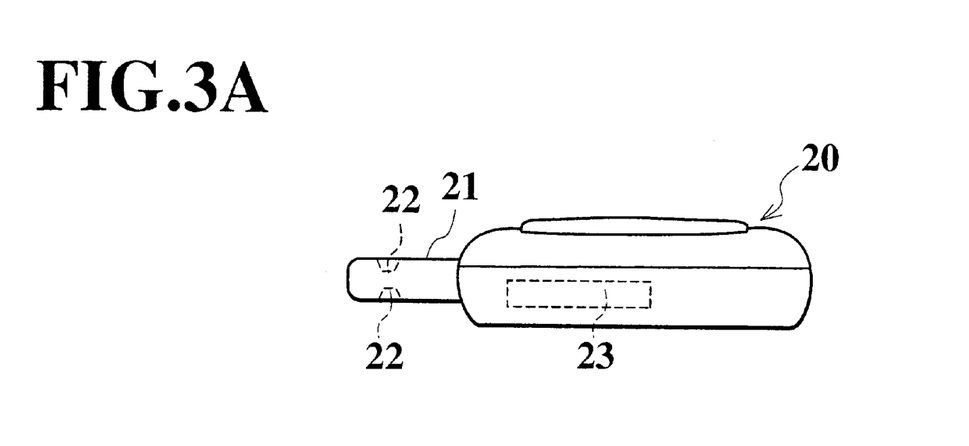
FIGS. 3A to 3C are explanatory diagrams showing each electronic key and mechanical key according to the embodiment.

The insertion portion 21 of the electronic key 20 has a concave portion 22 which the contact portion 12a of the slider 12 engages or disengages from. If the insertion portion 21 is inserted into the electronic key insertion hole 5A completely, the contact portion 12a engages the concave portion 22 so as to prevent the electronic key 20 from escaping.

Figure 3B:
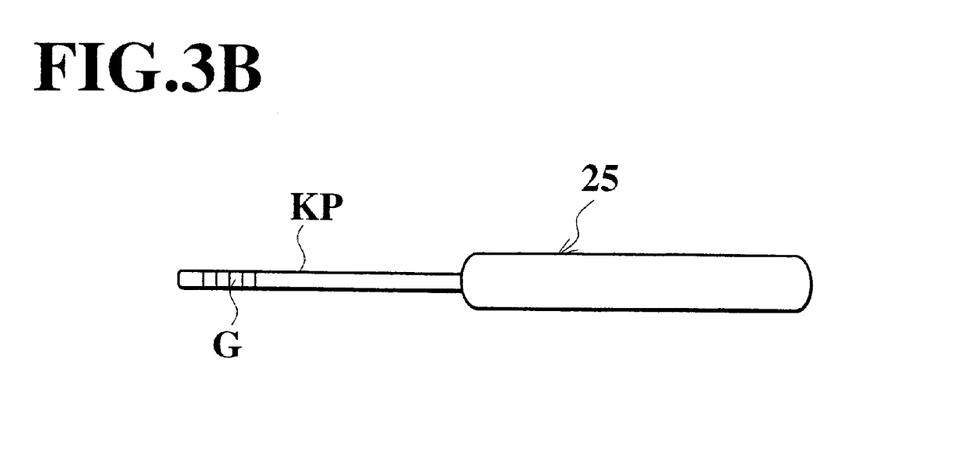

The thickness of a portion of the concave portion 22 is set to substantially the same as the thickness of a key plate portion KP of the mechanical key 25. Key grooves G are formed in the key plate portion KP.

When the electronic key 20 or mechanical key 25 is inserted appropriately, a bottom end of the slider 12 makes flush with an outer peripheral face of the large diameter portion of the key cylinder 1.

If the thick portion of the electronic key 20 at a front end thereof keeps contact with the contact portion 12a of the slider 12 because of an incomplete insertion of the electronic key 20, the bottom end of the slider 12 is protruded from an outer peripheral face of the key cylinder 1 so that a rotation of the key cylinder 1 is prevented.

On the other hand, when the electronic key 20 or mechanical key 25 is inserted appropriately and turned, the bottom end of the slider 12 is not protruded, so that the rotation of the key cylinder 1 is not prevented. Further, the bottom end of the slider 12 opposes the inner peripheral face of the cylinder casing 2 instead of the end of the switch lever 14. A return of the slider 12 is prevented by the inner peripheral face, so that the electronic key 20 or mechanical key 25 is not releasable at other positions than the lock position of the key cylinder 1.

The electronic key 20 incorporates a circuit chip 23 which memorizes a predetermined identity code (ID).

An end portion of the housing 3 has an annular antenna coil 18 as a detector for an electronic signal dispatched from the electronic key 20, the antenna coil being provided around that portion.

In FIG. 1, reference numeral 26 denotes a shutter and reference numeral 27 denotes a cylinder cap.

Figure 4:
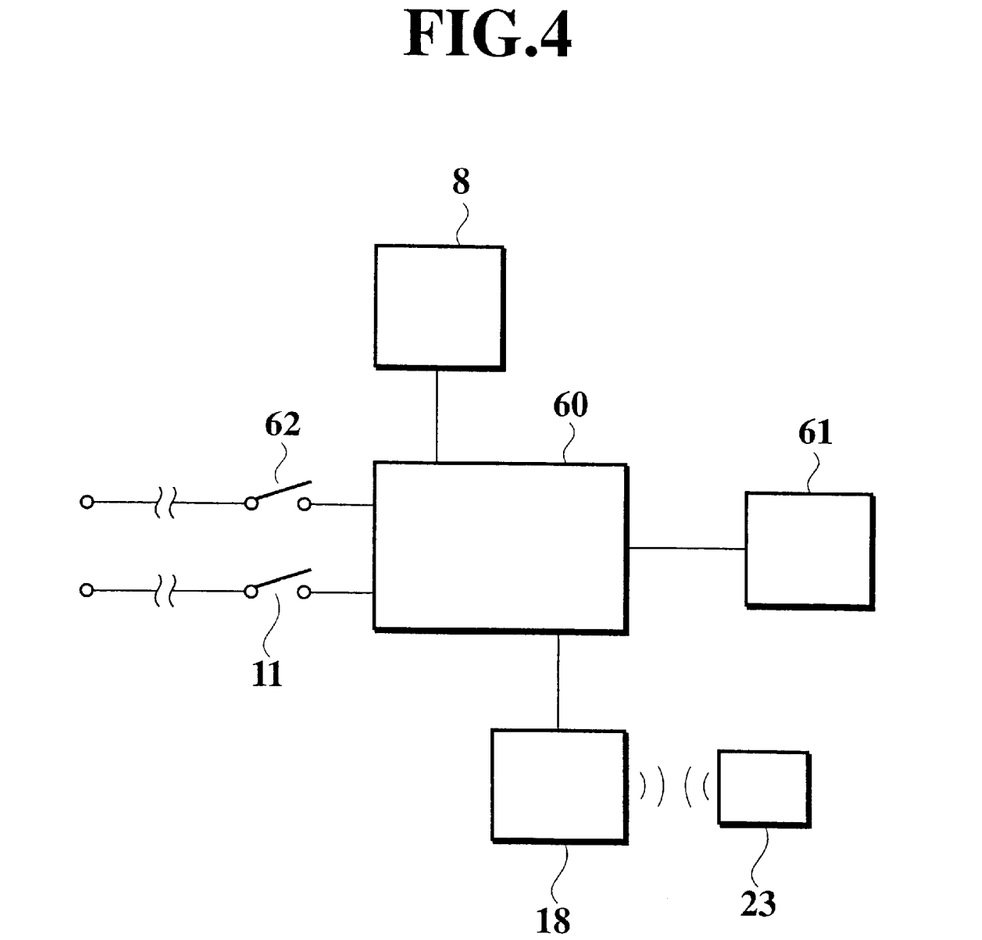
FIG. 4 is a block diagram of the electric circuit according to the embodiment.

In electric circuit structure according to this embodiment, as shown in FIG. 4, a key cylinder lock solenoid 8, a key presence/absence detecting switch 11, an antenna coil 18, a driving control unit 61, and an ignition switch 62 are connected to a control unit 60. Transmission and reception of a predetermined electronic signal are carried out between the antenna coil 18 and the circuit chip 23 of the electronic key 20.

An operation of this embodiment will be described in detail.

First, when the insertion portion 21 of the electronic key 20 is inserted into the electronic key insertion hole 5A of the key cylinder 1, the slider 12 is moved downward so that the key presence/absence detecting switch 11 is turned ON.

Next, correspondingly, the control unit 60 carries out transmission and reception of the electronic signal between the circuit chip 23 of the electronic key 20 and antenna coil 18 so as to verify ID memorized in the circuit chip 23 with ID memorized in the control unit 60.

Then, when the control unit 60 determined that both the IDs coincide with each other, the control unit 60 generates an engine driving permission signal and sends a lock release signal to the key cylinder lock solenoid 8.

If the lock release signal is sent from the control unit 60 to the key cylinder lock solenoid 8, the stopper 9 is moved from a condition shown in FIG. 2A to a condition shown in FIG. 2B, namely, the stopper 9 is released from the lock groove 10 so that the sleeve 4 is unlocked.

If the sleeve 4 becomes unlocked as shown in FIG. 2B, when the electronic key 20 is turned, the key cylinder 1 is rotated with the sleeve 4 so as to release a steering lock (not shown), because the end of the tumbler 6 in the key cylinder 1 engages the tumbler engaging groove 7 in the sleeve 4 by a spring force of the tumbler spring 6a. At the same time, the key cylinder 1 is rotated so that the ignition switch 62 is also turned ON (the starter switch is actuated). As a result, the control unit 60 sends a driving permission signal to the engine driving control unit 61 so as to start the engine.

If a supply of electric power to the control unit 60 is disabled because the battery goes dead or other reason, unlocking operation of the key cylinder lock solenoid by the electronic key 20 is disabled. Thus, the steering lock remains locked so that steering operation is disabled.

Then, in this case, when the mechanical key 25 shown in FIG. 3B is inserted into the mechanical key insertion hole 5B of the key cylinder 1, as shown FIG. 2C, the tumbler 6 is accommodated in the key cylinder 1. Correspondingly, engagement of the key cylinder 1 with the sleeve 4 whose rotation is locked by the key cylinder lock solenoid 8 is released, so that the key cylinder 1 is capable of rotating freely.

Thus, according to this embodiment, even when the unlocking operation of the key cylinder lock solenoid 8 by the electronic key 20 cannot be carried out, by using the mechanical key 25 and turning the key cylinder 1, the steering lock (not shown) can be released. As a result, the steering operation is enabled so that a vehicle can be moved to a desired place.

Because the mechanical key insertion hole 5B is formed so as to be continuous after the electronic key insertion hole 5A in the deeper place relative thereto, both the electronic key 20 and mechanical key 25 can be inserted into the key insertion hole 5 of the key cylinder 1 and rotated, so that an operator does not feel inconvenience and strangeness.

Upon using the electronic key 20, because when the electronic key 20 is inserted into the key insertion hole 5 appropriately, the contact portion 12a of the slider 12 of the key presence/absence detecting switch 11 engages the concave portion 22 of the insertion portion 21. Thus, the slider 12 can be used effectively as a member for preventing an escape of the electronic key 20.

Further, when the insertion of the electronic key is incomplete in a condition that the slider 12 is pressed down by the thick portion forward of the concave portion, the bottom end of the slider 12 is protruded from the outer peripheral face of the key cylinder 1. As a result, it engages an edge of the window portion 2a of the cylinder casing 2 in a rotation direction of the key cylinder 1 so as to prevent a rotation of the key cylinder 1. Thus, it is possible to avoid startup of engine in a condition that the electronic key 20 is inserted incompletely.

Figure 3C:
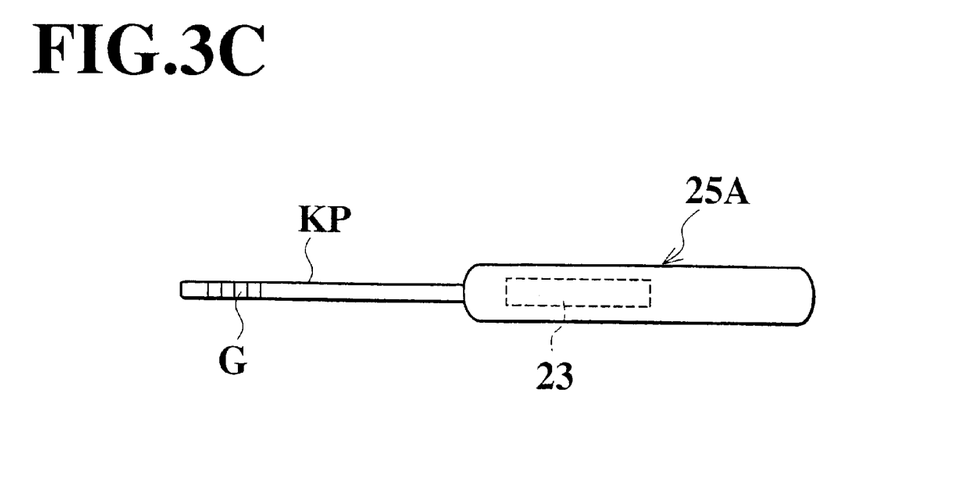

Further, by making the thickness of the concave portion 22 of the insertion portion 21 of the electronic key 20 the same as the thickness of the key plate portion KP of the mechanical key 25, one slider 12 is capable of detecting both the electronic key 20 and mechanical key 25. Therefore, despite a simple structure, as the mechanical key 25, the IMMOBI key (immobilization key) 25A can be used as a so-called double key having the same circuit chip 23 as the electronic key 20 in a key head and key groove G as shown in FIG. 3C for spare key.

When the key cylinder is rotated by using the electronic key 20, IMMOBI key 25 or IMMOBI key 25A, the bottom end of the slider 12 makes flush with the outer peripheral face of the key cylinder 1. Thus, the bottom end of the slider 12 is not hooked so that the key cylinder 1 is rotated. Further, the slider 12 is prevented from being returned by an inner peripheral face of the cylinder casing 2, so that the electronic key 20 or the like can be effectively prevented from being removed at a position other than the lock position of the key cylinder 1.

Although, according to this embodiment, the steering lock apparatus of an automobile is mentioned as an example, the present invention is not restricted to this example, but can be applied to lock apparatuses in, for example, commonly used door (automatic door: unlocked with an electronic key) of apartment house or door of each house (locked or unlocked with an electronic key or mechanical key), lock apparatus of cashbox and the like. Further, the present invention can be also applied to a lock apparatus which utilizes the mechanical key as a master key for use at an emergency and the electronic key as an ordinary key.

Although, according to this embodiment, the circuit chip 23 of the electronic key 20 sends or receives ID signal to/from the antenna coil 18 through electronic wave, the present invention is not restricted to this example, but electromagnetic wave such as infrared ray can be used as a signal carrier for transmission and reception, and the ID signal may be sent or received to/from the infrared ray sensor.

Next, a lock apparatus and lock system of a second embodiment of the present invention will be described with reference to mainly FIGS. 5 to 7.

A basic structure of this embodiment is the same as the first embodiment and the same structure will be described simply.

The key for use in this embodiment is electronic key 20, mechanical key 25 or IMMOBI key 25A and its electrical circuit structure is the same as the first embodiment.

Figure 5:
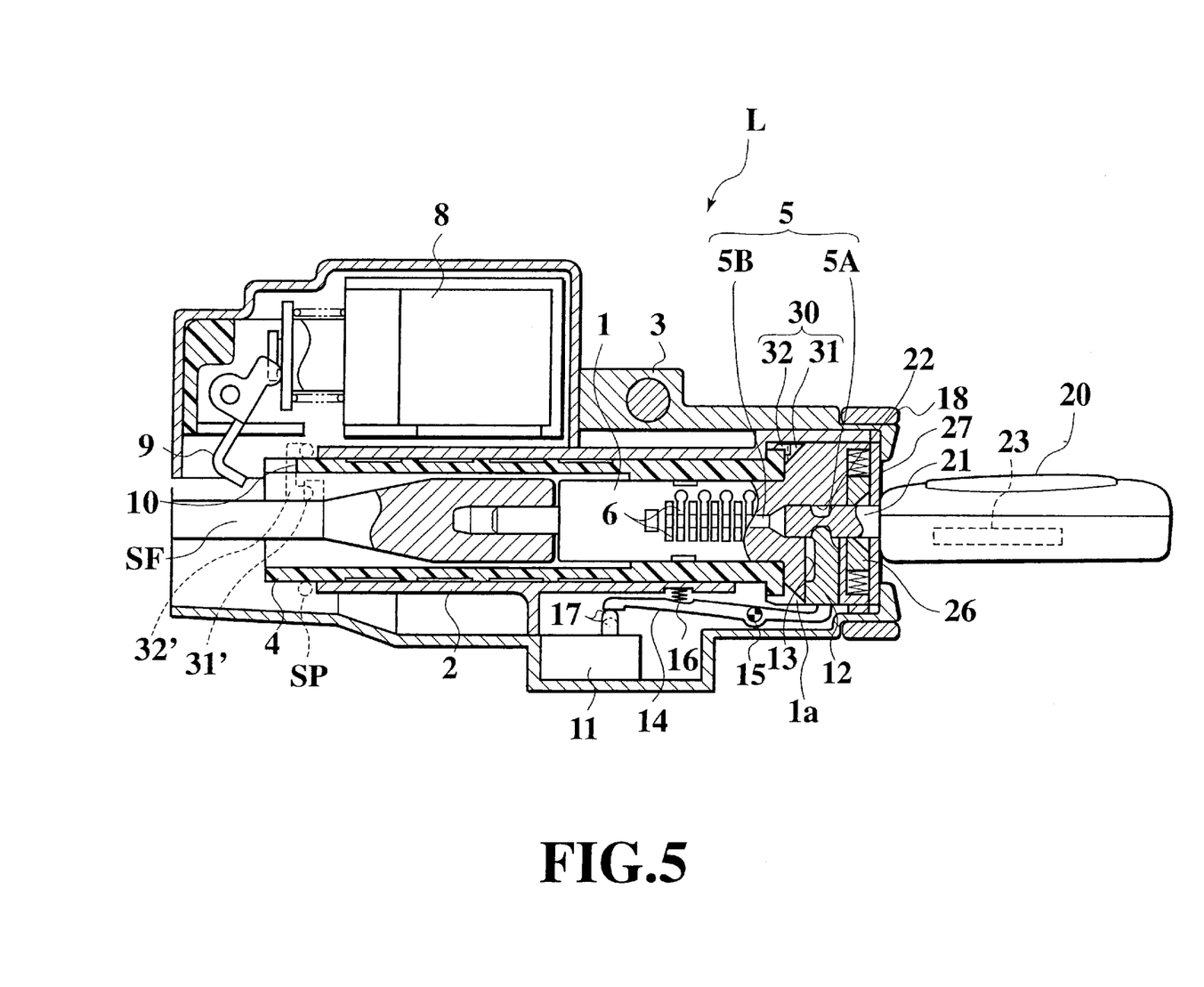
FIG. 5 is a sectional diagram showing a lock apparatus and lock system according to a second embodiment of the present invention.

As shown in FIG. 5, the cylinder casing 2 is fixed on the housing 3 and the key cylinder 1 is inserted freely rotatably into the sleeve 4 whose small diameter portion is disposed in the cylinder casing freely rotatably.

The key insertion hole 5 of the key cylinder 1 is comprised of the electronic key insertion hole 5A and mechanical key insertion hole 5B.

The key cylinder 1 includes a plurality of tumblers 6 which advance and retreats from/to a peripheral face of the mechanical insertion hole 5B corresponding to an insertion or removal of the mechanical key 25 into/from the mechanical insertion hole 5B.

Figure 7A:
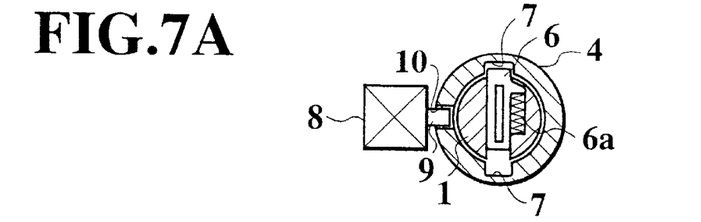
FIGS. 7A to 7E are explanatory diagrams for explaining schematically a relation between the key cylinder and sleeve according to the embodiment.
Figure 7B:
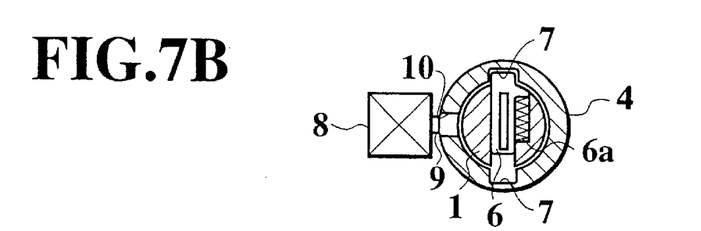
Figure 7C:
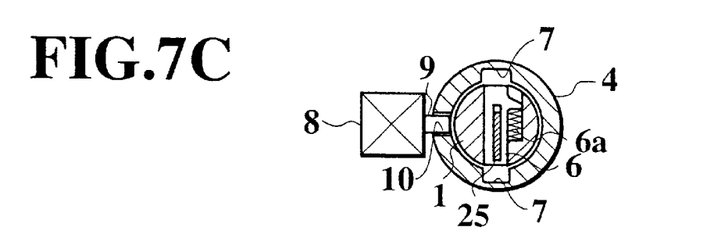

Tumbler engaging grooves 7 are formed in an inner peripheral face of the sleeve 4 as shown in FIGS. 7A to 7C so that the tumblers 6 engage and disengage from the tumbler engaging grooves 7. Corresponding to engagement and disengagement between the tumbler 6 and tumbler engaging groove 7, connection and disconnection of the sleeve 4 and key cylinder 1 are carried out.

The key cylinder lock solenoid 8 is disposed in the upper portion of the housing 3 and acts as a key cylinder lock actuator so as to engage or disengage the stopper 9 with/from the lock groove 10 provided in the sleeve 4, thereby locking or unlocking a rotation of the sleeve 4 correspondingly.

The key presence/absence detecting switch 11 for detecting whether or not a key is inserted into the key insertion hole 5 of the key cylinder 1 is provided in the lower portion of the housing 3.

The slider hole 13 is provided in the lower portion of the key cylinder 1 such that it goes through a center position of the electronic key insertion hole 5A. The slider 12 is disposed in the slider hole 13 freely slidably in a direction perpendicular to the electronic key insertion hole 5A.

The switch lever 14 is swingably supported by the pin 15 in the lower portion of the housing 3.

An end of the switch lever 14 is urged upward by the spring 16 so that the slider 12 is pushed upward by that end and a top end of the slider 12 is protruded into the electronic key insertion hole 5A. By inserting the insertion portion 21 of the electronic key 20 into the electronic key insertion hole 5A or inserting the key plate portion KP of the mechanical key 25 into the mechanical key insertion hole 5B, the slider 12 is moved downward. Consequently, pressing of the actuating element by the key presence/absence detecting switch 11 by the other end of the switch lever 14 is released so as to turn ON the key presence/absence detecting switch 11.

The concave portion 22 which a tip of the slider 12 engages or disengages from is formed in the insertion portion 21 of the electronic key 20. If the insertion portion 21 is inserted into the electronic key insertion hole 5A completely, the tip of the slider 12 engages the concave portion 22 so as to prevent the electronic key from being removed out.

The electronic key 20 contains the circuit chip 23 memorizes the ID.

An end portion of the housing 3. has an annular antenna coil 18 provided therearound.

This embodiment further comprises a sleeve return mechanism 30 in addition to the above described structure.

If the sleeve 1 deviates in a rotation direction with respect to the key cylinder 1 when the key cylinder 1 is rotated with the IMMOBI key 25A, the sleeve return mechanism 30 corrects that deviation.

Figure 6:
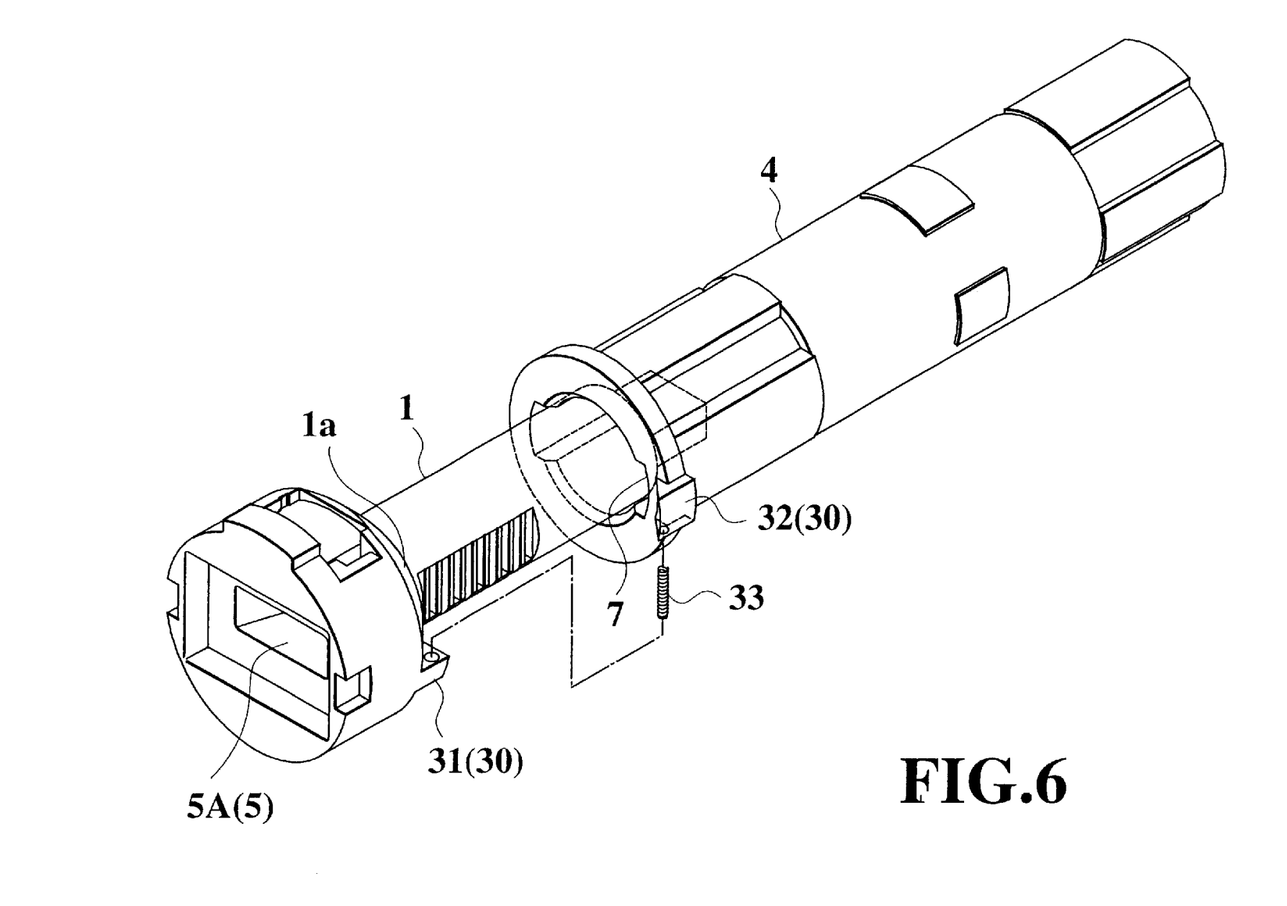
FIG. 6 is a perspective diagram showing the sleeve return mechanism according to the embodiment.

As understood easily with reference to FIG. 6, the sleeve return mechanism 30 is comprised of a cylinder protrusion 31 which is provided to protrude backward (in a direction toward a deeper side in an axial direction of the key cylinder 1) in a tapered portion 1a connecting a small diameter portion with a large diameter portion of the key cylinder 1 such that it is not protruded in a diameter direction from an outer peripheral face of the large diameter portion of the key cylinder 1, and a sleeve side protrusion 32 which is provided on an end portion of the sleeve 4, namely, forward end (an edge of an end portion near a front side in the axial direction of the key cylinder 1 and functions as a sleeve side stopper) of the sleeve 4, so as to engage the cylinder side protrusion 31 when the key cylinder 1 is rotated in a return direction to the lock position.

According to this embodiment, a spring 33 for urging the key cylinder 1 and sleeve 4 in opposite rotating directions to each other is provided between the cylinder side protrusion 31 and sleeve side protrusion 32.

With such a structure, a starting operation of engine is carried out by the electronic key 20 in ordinary case.

If the insertion portion 21 of the electronic key 20 is inserted into the electronic key insertion hole 5A of the key cylinder 1, the slider 12 is moved downward so that the key presence/absence detecting switch 11 is turned ON.

Correspondingly, transmission and reception are carried out between the circuit chip 23 of the electronic key 20 and antenna coil 18 by the control unit 60, so that the ID memorized in the circuit chip 23 is verified with the ID memorized in the control unit 60.

If both the IDs coincide with each other, the control unit 60 generates an engine driving permission signal and at the same time, lock release signal to the key cylinder lock solenoid 8. Consequently, the stopper 9 is changed from a state shown in FIG. 7A to a unlocking state shown in FIG. 7B in which the stopper 9 is removed from the lock groove 10.

At this time, an end of the tumbler 6 of the key cylinder 1 engages the tumbler engaging groove 7 in the sleeve 4 by a spring force of the tumbler spring 6a as shown in FIG. 7C. Thus, when the electronic key 20 is rotated, the key cylinder 1 is rotated with the sleeve 4 so as to release the steering lock (not shown). At the same time, the ignition switch 62 is turned ON (starter switch is actuated) by a rotation of the key cylinder 1 and then, the control unit 60 sends said driving permission signal to the engine driving control unit 61 so as to start the engine.

If a supply of electric power to the control unit 60 is disabled because the battery goes dead or other reason, unlocking operation of the key cylinder lock solenoid 8 by the electronic key 20 is disabled. Thus, the steering lock remains locked, so that steering operation is disabled.

In this case, when the mechanical key 5 is inserted into the mechanical key insertion hole 5B of the key cylinder 1 like the first embodiment, the tumbler 6 is submerged into the key cylinder 1 as shown in FIG. 7C. As a result, engagement thereof with the sleeve 4 whose rotation is locked by the key cylinder lock solenoid 8 is released, so that the rotation of the key cylinder 1 is made free.

Thus, in this embodiment also, it is possible to release the steering lock (not shown) by rotating the key cylinder 1 by means of the mechanical key 25. As a result, steering operation is enabled, so that the vehicle can be moved to a desired place by carrying out the steering operation to cope with an emergency or the like.

Here, by providing a key head with the same circuit chip 23 as the circuit chip 23 used in the electronic key 20 like the above embodiment, the IMMOBI key having both the functions of the mechanical key and electronic key, namely so-called double key, may be prepared as a mechanical key for spare in some case. In some case, although the electronic key 20 is located near the antenna coil 18 of the control unit 60, namely within a range in which the ID signal can be transmitted or received, the mechanical key may be used. That is, when the IMMOBI key 25A or mechanical key 15 is used for startup of the engine at other times than an emergency such as when the battery goes dead, is used, a deviation in the rotation direction occurs between the key cylinder 1 and sleeve 4, so that a removal of the key may become uneasy or difficult.

That is, in case where the mechanical key such as the IMMOBI key 25A prepared as a spare key is used for the startup of the engine at other times than an emergency, when the mechanical key such as the IMMOBI key 25A is inserted into the mechanical key insertion hole 5B of the key cylinder 1, as shown in FIG. 7C, engagement between the tumbler 6 and sleeve 4 is released. In this case, the key cylinder 1 can be rotated with respect to the sleeve 4. Then, when the slider 12 of the key presence/absence detecting switch 11 is pushed in a process for inserting the mechanical key such as the IMMOBI key 25A and then the key presence/absence detecting switch 11 is turned ON, verification of the ID memorized in the circuit chip 23 of the IMMOBI key 25A with ID memorized in the circuit chip 23 of the electronic key placed nearby is started. If the IDs coincide with each other, the key cylinder lock solenoid 8 acts to release the lock so that a rotation of the sleeve 4 with respect to the housing 3 is made free.

Thus, when the key cylinder 1 is rotated by the mechanical key such as the IMMOBI key 25A, the position of the sleeve 4 deviates in the rotation direction depending on the behavior of friction between the key cylinder land sleeve 4. As a result, even when the key cylinder is returned to its original position, the sleeve 4 may not be returned to its original locking position.

In such a case, engagement between the tumbler 6 and sleeve 4 is disabled, so that there is produced a possibility that the mechanical key such as the IMMOBI key 25A cannot be inserted or removed.

However, according to this embodiment, even when the sleeve 4 deviates in the rotation direction with respect to the key cylinder 1, the sleeve 4 is returned to the locking position by the sleeve return mechanism 30, so that such a deviation of position is automatically corrected. Thus, such an event that the mechanical key such as the IMMOBI key 25A cannot be removed is suppressed effectively so that freedom of use of the key is expanded.

More specifically, according to this embodiment, the sleeve return mechanism 30 is provided in both the key cylinder 1 and sleeve 4 and comprised of the cylinder side protrusion 31 and sleeve side protrusion 32, which are capable of engaging each other when the key cylinder 1 is rotated in a return direction to the locking position. Such a structure is simple and advantageous in terms of production cost.

Further, the stopper mechanism (not shown) is provided between the sleeve 4 and housing 3 not to return the sleeve 4 excessively counterclockwise beyond an appropriate locking position when the sleeve 4 is returned to the locking position by the sleeve return mechanism 30. Thus, the sleeve 4 is not rotated counterclockwise beyond the appropriate locking position.

Further, according to this embodiment, the spring 33 for urging the key cylinder 1 and sleeve 4 in opposite rotating directions to each other is provided between the cylinder side protrusion 31 and sleeve side protrusion 32.

This reason is as follows. Assuming that when the key cylinder 1 is rotated by means of the mechanical key such as the IMMOBI key 25A, no deviation occurs between the key cylinder 1 and sleeve 4, in other words, when the sleeve 4 is rotated with the tumbler engaging groove 7 matching the tumbler 6 when the key cylinder 1 is rotated clockwise with respect to the starter position from the locking position, the mechanical key such as the IMMOBI key 25A cannot be removed at any position, for example, Acc position (accessory position), because the tumbler engaging groove 7 and tumbler 6 are in a condition that they are capable of engaging each other.

Figure 7D:
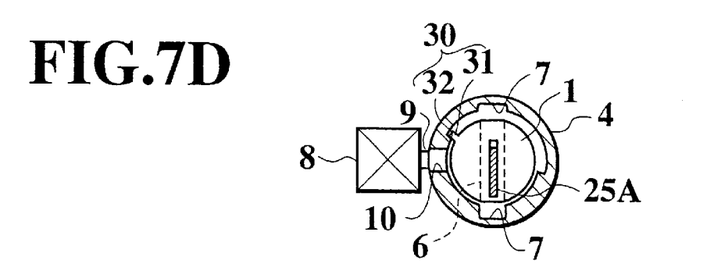
Figure 7E:
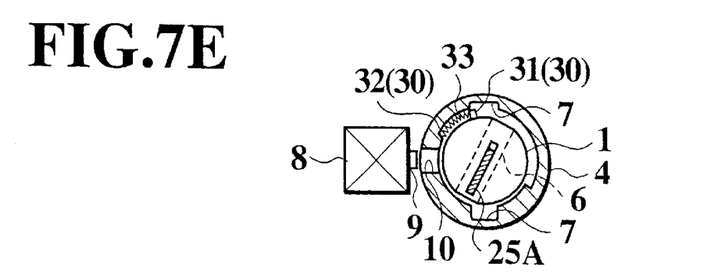

However, according to this embodiment, it is so constructed that a deviation occurs in the rotation direction between the key cylinder 1 and sleeve 4 by using the spring 33. Thus, when the key cylinder 1 is rotated in a direction to the starter position by means of the mechanical key such as the IMMOBI key 25A, the sleeve 4 deviates in the rotation direction with respect to the key cylinder 1 as shown in FIG. 7E, so that uncoincidence between the tumbler 6 and tumbler engaging groove 7 is generated.

Thus, with such a structure, when the key cylinder 1 is located at other positions than the locking position, although the tumbler 6 coincides with the tumbler engaging groove 7, it is possible to effectively prevent the mechanical key such as the IMMOBI key 25A from being removed out.

Of course, when there is no trouble when the mechanical key is removed at other positions than the locking position, it is permissible to omit the spring 33. FIG. 7D shows such a structure in which the spring 33 is omitted and thus the gap between the protrusions 31 and 32 does not exist.

According to this embodiment, as described above, in addition to the effect of the first embodiment, even when the sleeve 4 is deviated in the rotation direction with respect to the key cylinder 1, the sleeve can be corrected to its right position by the sleeve return mechanism 30. Therefore, an event that the mechanical key 25, 25A such as the double key cannot be removed never occurs, so that freedom of the key for use can be expanded.

That is, when the double key 25A including the circuit chip 23 at its key head like the electronic key 20 is prepared as the mechanical key or when although the electronic key 20 is located within a range in which the control unit 60 is capable of sending or receiving, the mechanical key 25 is used and then the mechanical key such as the double key is used to rotate the key cylinder 1 and the IDs coincide so that the key cylinder lock solenoid 8 releases the locking to make free the rotation of the sleeve 4, the sleeve 4 deviates in the rotation direction even when the key cylinder 1 is returned to its original locking position. As a result, the engagement between the tumbler 6 and sleeve 4 is disabled so that the removal of the mechanical key such as the double key is disabled. However, according to this embodiment, it is possible to remove this possibility effectively.

Further, because the sleeve return mechanism 30 is comprised of the cylinder side stopper and sleeve side stopper, the entire structure can be simplified and advantageous in terms of production cost.

Further, when the spring 33 is provided, the key cylinder lock solenoid 8 releases the lock when the double key or the like is used and further, when the key cylinder 1 is rotated, a deviation occurs between the sleeve 4 and key cylinder 1 in the rotation direction by a spring force of the spring 33 so that uncoincidence between the tumbler 6 and tumbler engaging groove is generated. Therefore, it is possible to prevent an event that the double key or the like may be removed when the key cylinder 1 is located at other positions than the locking position.

Next, the lock apparatus and lock system according to a third embodiment of the present invention will be described mainly with reference to FIG. 8.

A basic structure of this embodiment is the same as the second embodiment and a description of the same structure and operation is omitted.

More specifically, according to this embodiment, a cylinder side stopper 31' and a sleeve side stopper 32' of a sleeve return mechanism 30' are provided at a rear portion (deep side in the axial direction of the key cylinder 1) of the key cylinder 1 having a sufficient space as indicated by dotted line of FIG. 5.

Figure 8:
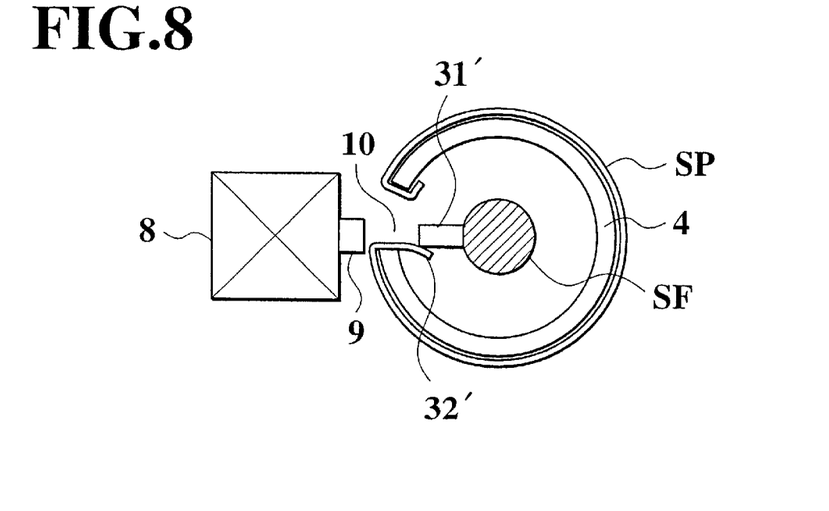
FIG. 8 is a diagram corresponding to sectional views of FIGS. 7A to 7E showing the sleeve return mechanism of the lock apparatus and lock system according to a third embodiment of the present invention.

That is, speaking more in detail, as shown in FIG. 8, the cylinder side stopper is a cylinder side protrusion 31' protruded outward in the diameter direction from a portion corresponding to a rear end of the sleeve 4, of a shaft member SF connected to the key cylinder 1.

On the other hand, the sleeve side stopper is a sleeve side protrusion 31' which is an end portion of a spring member SP fit to an outer face of the rear end of the sleeve 4, which is protruded inward from the lock groove 10 so as to oppose the cylinder side protrusion 31'. Then, because the sleeve side protrusion 32' itself has an elasticity, it exerts a function of the spring 33 between the cylinder side stopper and sleeve side stopper of the second embodiment.

Therefore, according to this embodiment also, even when the sleeve 4 deviates in the rotation direction with respect to the key cylinder 1, the sleeve 4 can be corrected to its right position by the sleeve return mechanism 30'. Thus, such an event that the mechanical key such as the double key cannot be removed never occurs, so that freedom of the key for use can be expanded.

Further, because the sleeve return mechanism 30' is provided in the rear portion of the key cylinder 1 having an excessive space, freedom of part layout can be increased.

Further, because the sleeve side protrusion 32' itself has an elasticity, it is not necessary to provide with an additional spring so that a simple structure is achieved.

Meanwhile, according to this embodiment, it is permissible to construct the cylinder side protrusion 31' using a spring member.

Further, it is also permissible to use the protrusions 31', 32' of this embodiment together with the protrusions 31, 32 of the second embodiment. In such a case, by making the cylinder side protrusion 31' and sleeve side protrusion 32' contact each other earlier than the cylinder side protrusion 31 and sleeve side protrusion 32 contact each other so as to generate a spring force, it is permissible to form a stopper structure capable of bearing an excessive input of force with the cylinder side protrusion 31 and sleeve side protrusion 32.

The cylinder side stopper and sleeve side stopper described in the second and third embodiments are not restricted to such a structure, but when they exist between the key cylinder 1 and sleeve 4, it is needless to say that they may be formed on the key cylinder 1 or sleeve 4 directly or indirectly.

The entire contents of a Patent Application No. TOKUGANHEI 11-165699 with a filing date of Jun. 11, 1999 in Japan, and those of a Patent Application No. TOKUGANHEI 11-165653 with filing date of Jun. 11, 1999 in Japan are hereby incorporated by reference.

Although the invention has been described above by reference to certain embodiments of the invention, the invention is not limited to the embodiments described above. Modifications and variations of the embodiments described above will occur to those skilled in the art, in light of the teachings. The scope of the invention is defined with reference to the following claims.

What is claimed is:

1. A lock apparatus capable of being locked and unlocked by an electronic key and a mechanical key, comprising:
   a cylinder casing;
   a sleeve disposed rotatably inside the cylinder casing;
   a key cylinder disposed rotatably inside the sleeve and having a mechanical key insertion hole in which the mechanical key insertion hole in which the mechanical key can be inserted;
   a tumbler disposed in the key cylinder,
   the tumbler being connected to the sleeve so as to lock a rotation of the key cylinder with respect to the sleeve and when the mechanical key is inserted into the mechanical key insertion hole of the key cylinder so that the mechanical key engages the tumbler, the connection thereof with the sleeve being released so as to enable the rotation of the key cylinder with respect to the sleeve;

a key cylinder lock actuator locking and unlocking a rotation of the sleeve with respect to the cylinder casing;

a control unit disposed on the side of the key cylinder and carrying out transmission and reception of an electronic signal so as to perform ID verification between the control unit and a circuit chip disposed on the side of the electronic key and generating an electronic signal, the control unit, when an ID of the control unit and an ID of the electronic key coincide with each other as a result of the ID verification, sends a lock release signal to the key cylinder lock actuator so as to release a lock on the rotation of the sleeve with respect to the cylinder casing; and a key cylinder operating portion capable of rotating the key cylinder when the ID of the control unit and the ID of the electronic key coincide with each other as a result of the ID verification, whereby when as a result of the ID verification, the ID of the control unit and the ID of the electronic key coincide with each other and the rotation of the sleeve with respect to the cylinder casing is released and also when the tumbler engages the sleeve, the key cylinder is rotatable with the sleeve by operating the key cylinder operating portion.

2. A lock apparatus according to claim 1, wherein the key cylinder operating portion is disposed in the key cylinder and has a function as an electronic key engaging portion which the electronic key engages.

3. A lock apparatus according to claim 2, wherein the key cylinder operating portion includes an electronic key insertion hole in which the electronic key is to be inserted and the mechanical key inserting hole is formed continuously with and in a deeper portion relative to the electronic key insertion hole so that the electronic key insertion hole and the mechanical key insertion hole compose a sequential key insertion hole.

4. A lock apparatus according to claim 3, further comprising a key presence/absence detecting sensor, when at least the electronic key is inserted into the key cylinder, detecting that the electronic key is inserted and actuating the control unit so as to perform the ID verification.

5. A lock apparatus according to claim 3, further comprising a key presence/absence detecting sensor, when at least the electronic key cylinder so as to be protruded into the electronic key insertion hole at an intermediate position in an axial direction of the electronic key insertion hole, the key detecting member thereby being capable of making contact with the mechanical key or the electronic key.

6. A lock apparatus according to claim 5, wherein the key detecting member engages the electronic key inserted into the electronic key insertion hole.

7. A lock apparatus according to claim 5, wherein the key detecting member is provided with a first end portion making contact with the mechanical key or the electronic key and a second end portion with respect to the first end portion, while the second end portion connects with a detecting portion of the key presence/absence detecting sensor.

8. A lock apparatus according to claim 7, wherein when the first end portion comes into contact with the mechanical key or the electronic key, the second end portion becomes flush with an outer peripheral face of the key cylinder, and when the first end portion does not come into contact with the electronic key or the mechanical key, the second end portion is submerged from the outer peripheral face of the key cylinder.

9. A lock apparatus according to claim 8, wherein the detecting portion of the key presence/absence detecting sensor is capable of coming into contact with the second end portion, thereby when the second end portion is flush with the outer peripheral face of the key cylinder and the key cylinder is rotated, the detecting portion being moved from the second end portion to the outer peripheral face of the key cylinder.

10. A lock apparatus according to claim 1, further comprising a sleeve return mechanism capable of correcting a deviation of the sleeve with respect to the key cylinder which occurs when the key cylinder is rotated by the mechanical key.

11. A lock apparatus according to claim 10, wherein the sleeve return mechanism is provided with a cylinder side stopper disposed in the key cylinder and a sleeve side stopper disposed in the sleeve while the cylinder side stopper and the sleeve side stopper are capable of engaging each other with respect to a rotation of the key cylinder in a return direction thereof.

12. A lock apparatus according to claim 11, further comprising a spring disposed between the cylinder side stopper and the sleeve side stopper urging the key cylinder and the sleeve in opposite rotation directions to each other.

13. A lock system including a lock apparatus capable of being locked and unlocked by an electronic key and a mechanical key, comprising:

a mechanical key having a key plate portion in which a key groove is formed;

a cylinder casing;

a sleeve disposed rotatably inside the cylinder casing;

a key cylinder disposed rotatably inside the sleeve and having a mechanical key insertion hole in which the mechanical key can be inserted;

a tumbler disposed in the key cylinder;

the tumbler being connected to the a sleeve so as to lock a rotation of the key cylinder with respect to the sleeve and when the mechanical key is inserted into the mechanical key insertion hole of the key cylinder so that the mechanical key engages the tumbler, the connection thereof with the sleeve being released so as to enable the rotation of the key cylinder with respect to the sleeve;

a key cylinder lock actuator locking and unlocking a rotation of the sleeve with respect to the cylinder casing;

a control unit disposed on the side of the key cylinder and carrying out transmission and reception of an electronic signal so as to perform ID verification between the control unit and the circuit chip generating the electronic signal and disposed on the side of the electronic key, the control unit, when an ID of the control unit and an ID of the electronic key coincide with each other as a result of the ID verification, sends a lock release signal to the key cylinder lock actuator so as to release a lock on the rotation of the sleeve with respect to the cylinder casing; and a key cylinder operating portion capable of rotating the key cylinder when the ID of the control unit and the ID of the electronic key coincide with each other as a result of the ID verification, wherein when as a result of the ID verification, the ID of the control unit and the ID of the electronic key coincide with each other and the rotation of the sleeve with respect to the cylinder casing is released and also when the tumbler engages the sleeve, the key cylinder is rotatable with the sleeve by operating the key cylinder operating portion.

14. A lock apparatus according to claim 13, wherein an insertion portion is provided on the electronic key so as to be inserted into an electronic key insertion hole, and the key cylinder operating portion is disposed in the key cylinder and includes the electronic key insertion hole in which the insertion portion of the electronic key is to be inserted, and wherein the mechanical key insertion hole is formed continuously with and in a deeper portion relative to the electronic key insertion hole so as to accommodate a key plate portion of the mechanical key while the electronic key insertion hole and the mechanical key insertion hole compose a sequential key insertion hole.

15. A lock apparatus according to claim 14, further comprising a key presence/absence detecting sensor, when at least the electronic key is inserted into the key cylinder, detecting that the electronic key is inserted and actuating the control unit so as to perform the ID verification.

16. A lock apparatus according to claim 15, wherein the key presence/absence detecting sensor is provided with a key detecting member which is disposed in the key cylinder so as to be protruded into the electronic key insertion hole at an intermediate position in an axial direction of the electronic key insertion hole and which when the mechanical key or the electronic key is inserted into the electronic key insertion hole, is moved while being in contact therewith, and a sensing portion connecting with the key detecting member.

17. A lock apparatus according to claim 16, wherein the insertion portion of the electronic key has a thick portion agreeing with a thick portion of the key plate portion of the mechanical key and the key detecting member comes into contact with the insertion portion.

18. A lock apparatus according to claim 17, wherein a concave portion is formed in the insertion portion of the electronic key, and a thickness of the insertion portion at a portion in which the concave portion is formed agrees with the thickness of the key plate portion of the mechanical key, and wherein thick portions are provided before and after the concave portion in an insertion axis direction of the electronic key, and the key detecting member engages the concave portion.

19. A lock apparatus according to claim 18, wherein the key detecting portion is provided with a first end portion coming into contact with the mechanical key or the electronic key, and a second end portion located on an opposite side to the first end portion and capable of connecting with the sensing portion of the key presence/absence detecting sensor, and wherein when the first end portion comes into contact with the mechanical key or the electronic key, the second end portion becomes flush with an outer peripheral face of the key cylinder, and when the first end portion does not come into contact with the mechanical key or the electronic key, the second end portion is submerged from the outer peripheral face of the key cylinder.

20. A lock apparatus according to claim 19, wherein the outer peripheral face of the key cylinder and an inner peripheral face of the cylinder casing are opposed to each other with a minute gap and a receiving portion is provided correspondingly to a portion where the outer peripheral face of the key cylinder and the inner peripheral face of the cylinder casing opposed to each other such that the second end portion is capable of being protruded from the outer peripheral face of the key cylinder when the mechanical key or the electronic key is not completely inserted, and wherein when the first end portion of the key detecting member comes into contact with the thick portion of the insertion portion of the electronic key, the second end portion is protruded into the receiving portion from the outer peripheral face of the key cylinder.

* * * * *